United States Patent [19]

Tu et al.

[11] 3,933,407

[45] Jan. 20, 1976

[54] ARTICLES COATED WITH SYNERGISTIC ANTI-FOG COATINGS BASED ON HYDROPHILLIC POLYMERS AND ORGANOSILOXANE- OXYALKYLENE BLOCK COPOLYMERS

[76] Inventors: Robert S. Tu, 18 University Road, East Brunswick, N.J. 08816; John J. Shields, 13 Trenton Ave., Edison, N.J. 08817

[22] Filed: June 28, 1973

[21] Appl. No.: 374,784

[30] Foreign Application Priority Data

June 29, 1972 United Kingdom............... 30612/72

[52] U.S. Cl................ 350/61; 106/13; 215/12 R; 229/1.5 B; 260/827; 350/175 R; 350/288; 350/319; 427/162; 427/164; 427/165; 427/385; 427/387; 428/412; 428/429; 428/442; 428/447; 428/483; 428/510; 428/516; 428/520

[51] Int. Cl.² G02B 1/10; B32B 17/10; B32B 27/06; B32B 27/08

[58] Field of Search...... 117/124 E, 124 F, 138.8 E, 117/138.8 F, 138.8 UA, 145; 260/827; 106/13; 350/61, 175 R, 288, 319; 229/1.5 B; 215/12 R; 428/412, 429, 442, 447, 483, 510, 516, 520

[56] References Cited

UNITED STATES PATENTS

| | | | |
|---|---|---|---|
| 2,197,357 | 4/1940 | Widmer | 260/839 |
| 2,834,748 | 5/1958 | Bailey | 260/825 |
| 2,846,458 | 8/1958 | Hatuska | 260/448.2 B |
| 3,280,160 | 10/1966 | Bailey | 117/124 F |
| 3,299,112 | 1/1967 | Bailey | 260/448.2 B |
| 3,305,520 | 2/1967 | Fritz | 260/45.7 P |
| 3,337,351 | 8/1967 | Morehouse | 106/13 |
| 3,342,766 | 9/1967 | Huntington | 260/827 |
| 3,488,215 | 1/1970 | Shepherd | 117/124 E |
| 3,515,579 | 6/1970 | Shepherd | 117/124 E |
| 3,520,949 | 7/1970 | Shepherd | 260/827 |
| 3,536,779 | 10/1970 | Bedikian | 117/124 F |
| 3,556,754 | 1/1971 | Marsden | 260/827 |
| 3,575,910 | 4/1971 | Thomas | 260/827 |
| 3,597,384 | 3/1971 | Kugler | 117/124 E |
| 3,635,756 | 1/1972 | Shepherd | 117/124 D |
| 3,691,257 | 9/1972 | Kendrick | 260/827 |

*Primary Examiner*—William D. Martin
*Assistant Examiner*—William H. Schmidt
*Attorney, Agent, or Firm*—Cushman, Darby & Cushman

[57] ABSTRACT

Synergistic antifogging action is observed by applying a combination of (1) a hydroxyalkyl acrylate or methacrylate or the like and (2) an organosiloxane-oxyalkylene block copolymer to a glass or plastic surface which is normally fogging.

14 Claims, No Drawings

ARTICLES COATED WITH SYNERGISTIC ANTI-FOG COATINGS BASED ON HYDROPHILLIC POLYMERS AND ORGANOSILOXANE-OXYALKYLENE BLOCK COPOLYMERS

BRIEF SUMMARY OF THE INVENTION

Fog is prevented on a transparent or reflecting substrate by applying to a surface thereof a synergistic combination of (1) hydrophilic acrylate or methacrylate polymer, e.g., hydroxethyl methacrylate polymer and (2) a siloxane-oxyalkylene block copolymer.

DETAILED DESCRIPTION

This invention relates to the preparation of novel synergistic antifog coatings.

Fog is the formation of minute water droplets on the surface of a substrate, which obscures vision. Any material, which has the ability to prevent the condensation of these droplets, has antifog activity. Coatings formulated from hydrophilic acrylic polymers, such as polyhydroxyethyl methacrylate are examples. See for example Shepherd U.S. Pat. No. 3,515,579 the entire disclosure of which is incorporated by reference. These polymers absorb moisture before condensation and thus prevent fog formation. Hydrophilic coatings are generally water insoluble and remain effective until the polymer is saturated with moisture. Once the moisture is evaporated, the coating again becomes effective. Antifog coatings of this type remain functional permanently until they are mechanically damaged or removed. Certain wetting agents, such as organosiloxane-oxyalkylene block copolymers (L-77, L-530, Union Carbide Corp.) are also known as nonfogging agents, see Morehouse U.S. pat. No. 3,337,351 the entire disclosure of which is incorporated by reference. L-77 and L-530 are also described in Union Carbide Organosilicone Block Copolymers, Technical Brochure F-42361, the entire disclosure of which is hereby incorporated by reference. The antifog activity of these silicone materials follows another mechanism. When applied on the surface of a substrate, the attractive force of the wetting agent lowers the surface tension of the moisture droplets. Thus the droplets collapse, forming a monolithic transparent film. These wetting agents are water soluble and can be removed easily from the substrate by wetting with water. They are, therefore, effective only temporarily.

The use of hydroxyethyl methacrylate polymer (poly HEMA) antifog coating in meat packaging applications was explored. Poly-hydroxyethyl methacrylate was subsequently found to be suitable for this application on polyethylene film at a coating thickness of 0.01–0.1 mil. Following the preliminary studies, it was further demonstrated that in the presence of a small amount, generally 0.05–5 parts of L-77 organosiloxane-oxyalkylene block copolymer per 100 parts of poly HEMA in the poly-HEMA coating, a strong synergistic antifog activity existed on polyethylene films. The same phenomenon was also observed when L-77 (1 phr) was incorporated in the formulations of either Lens Coating as hereinafter defined (on polycarbonate) or Glass Coating as hereinafter defined (on glass).

The term poly HEMA as used in the present specification and claims refers to commercial polymerized hydroxyethyl methacrylate. Normally the starting monomer contains about 0.05–0.3% of ethylene glycol dimethacrylate as an impurity as well as about 0.05–0.3% of methacrylic acid as an impurity. These impurities are not normally removed in the polymerization but the art still calls the polymerization product poly HEMA.

As hydrophilic acrylic polymers there can be used polymer of hydroxy lower alkyl acrylates and methacrylates and hydroxy lower alkoxy lower alkyl acrylates and methacrylates. The lower alkoxy and lower alkyl groups usually have 2 to 3 carbon atoms. Thus there can be used polymers of 2-hydroxyethyl acrylate, 2-hydroxyethyl methacrylate, diethylene glycol monoacrylate, diethylene glycol monomethacrylate, hydroxy propyl acrylates and methacrylates, e.g., 2-hydroxypropyl acrylate, 2-hydroxypropyl methacrylate, 3-hydroxypropyl acrylate, 3-hydroxypropyl methacrylate, dipropylene glycol monomethacrylate. Acrylamide, methylol acrylamide, N-methylacrylamide, N-methyl methacrylamide, N-isopropyl acrylamide, methacrylamide and methylol methacrylamide also are useful hydrophilic monomers as are acrylamide, N,N-diisopropyl acrylamide, etc.

In preparing hydroxyalkyl monoacrylates and methacrylates a small amount of the diacrylate or dimethacrylate is also formed. This need not be removed and in fact its presence is frequently helpful in forming hard, abrasion, scratch and solvent resistant coatings. Usually not over 2% of such monomer, e.g., ethylene glycol dimethacrylate, ethylene glycol diacrylate, diethylene glycol dimethacrylate or the like, is employed. The amount of diester used as a cross-linking agent can be as much as 20%.

It is also advantageous to have present (1) an unsaturated acid or (2) an unsaturated amine, preferably including an unsaturated amide. It has been found desirable to copolymerize 80 to 99%, usually 85 to 98%, of the acrylate or methacrylate with 20 to 1%, usually 2 to 15%, of an ethylenically unsaturated mono or polycarboxylic acid or partial ester of an ethylenically unsaturated polycarboxylic acid.

To increase resistance to ammonia and other common alkaline cleaning preparations it has been found desirable instead of including an ethylenically unsaturated acid to include an ethylenically unsaturated amine, preferably together with an ethylenically unsaturated amide, to form a "terpolymer" with or without (a) an aminoplast or (b) ammonium dichromate.

When a "terpolymer" is formed it contains 75 to 98% of the acrylate or methacrylate with 1 to 10%, preferably 2 to 10% of the ethylenically unsaturated amine and 1 to 15%, preferably 2 to 10% of the unsaturated amide and preferably a small amount, e.g., 0.25 to 20%, preferably 0.5 to 10% of a polyethylenically unsaturated crosslinking agent.

The aminoplast, if employed, is employed in minor amount, usually 0.1 to 4% by weight of the terpolymer and the ammonium dichromate is normally used in an amount of 0.2 to 1%, preferably 0.1 to 0.5%, by weight of the terpolymer. The use of either the aminoplast or the dichromate results in a hard abrasion resistant coating or glass or plastic substrates.

As the ethylenically unsaturated acid there can be used acrylic acid, cinnamic acid, crotonic acid, methacrylic acid, itaconic acid, aconitic acid, maleic acid, fumaric acid, mesaconic acid and citraconic acid. Also, there can be used partial esters such as mono 2-hydroxypropyl itaconate, mono 2-hydroxyethyl itaconate, mono 2-hydroxyethyl citraconate, mono 2-hydroxypropyl aconitate, mono 2-hydroxyethyl maleate, mono 2-hydroxypropyl fumarate, mono methyl itaconate, monoethyl itaconate, mono methyl Cellosolve ester of itaconic acid (methyl Cellosolve is the monomethyl ether of ethylene glycol), mono methyl Cellosolve ester of maleic acid.

As the ethylenically unsaturated amine there can be used p-aminostyrene, o-aminostyrene, 2-amino-4-vinyltoluene, alkylamino alkyl acrylates and methacrylates, e.g., diethylaminoethyl acrylate, diethylaminoethyl methacrylate, dimethylaminoethyl acrylate, dimethylaminoethyl methacrylate, t-butylaminoethyl acrylate, t-butylaminoethyl methacrylate, piperidinoethyl acrylate, piperidinoethyl methacrylate, morpholinoethyl acrylate, morpholinoethyl methacrylate, 2-vinylpyridine, 3-vinyl pyridine, 4-vinyl pyridine, 2-ethyl-5-vinylpyridine, dimethylamino propyl acrylate, dimethylamino propyl methacrylate, dipropylaminoethyl acrylate, dipropylaminoethyl methacrylate, di-n-butylaminoethyl acrylate, di-n-butylaminoethyl methacrylate, di-sec. butylaminoethyl acrylate, di-sec. butylaminoethyl methacrylate, dimethylaminoethyl vinyl ether, dimethylaminoethyl vinyl sulfide, diethylaminoethyl vinyl ether, diethylaminoethyl vinyl sulfide, aminoethyl vinyl ether, aminoethyl vinyl sulfide, mono methylaminoethyl vinyl sulfide, monoethylaminoethyl vinyl ether, N-(gamma-monomethylamino) propyl acrylamide, N-(beta-monomethylamino) ethyl acrylamide, N-(betamonomethylamino) ethyl methacrylamide, 10-aminodecyl vinyl ether, 8-aminooctyl vinyl ether, 5-aminopentyl vinyl ether, 3-aminopropyl vinyl ether, 4-aminobutyl vinyl ether, 2-aminobutyl vinyl ether, monoethylaminoethyl methacrylate, N-(3,5,5-trimethylhexyl) aminoethyl vinyl ether, N-cyclohexylaminoethyl vinyl ether, 2-(1,1,3,3-tetramethylbutylamino) ethyl methacrylate, N-t-butylaminoethyl vinyl ether, N-methylaminoethyl vinyl ether, N-2-ethylhexylaminoethyl vinyl ether, N-t-butylaminoethyl vinyl ether, N-t-octylaminoethyl vinyl ether, 2-pyrrolidinoethyl acrylate, 2-pyrrolidinoethyl methacrylate, 3-(dimethylaminoethyl) - 2 - hydroxypropyl acrylate, 3-(dimethylaminoethyl), -2-hydroxy propyl methacrylate, 2-aminoethyl acrylate, 2-aminoethyl methacrylate. The presently preferred amino compounds are alkylaminoethyl acrylates and methacrylates, most preferably t-butyl aminoethyl methacrylate.

As the ethylenically unsaturated amide there is most preferably alkyl substituted acrylamides and methacrylamides, most preferably N-isopropyl acrylamide. There can also be used N-isopropyl methacrylamide, N-t-butyl acrylamide, N-t-butyl methacrylamide, diacetone acrylamide, diacetone methacrylamide, methylol acrylamide, methylol methacrylamide, acrylamide, methacrylamide, N-methyl acrylamide, N-methyl methacrylamide, N-(2-hydroxyethyl) acrylamide, N - 2 - hydroxyethyl) methacrylamide, N-butyl acrylamide, N-butyl methacrylamide, fumaric diamide, N,N'-dimethyl maleamide, N,N'-diethyl itaconic diamide, N,N'-dimethyl citraconic diamide, N,N'-dipropyl fumaric diamide, N,N'-diisopropylacrylamide.

As the aminoplasts there are used condensation products of an aldehyde, preferably formaldehyde, with a urea (i.e. urea per se or substituted ureas) or aminotriazine, e.g., urea, thiourea, ethylene urea, dicyandiamide, melamine, benzoguanamine, acetoguanamine, formoguanamine, ammeline, ammelide, 2,4,6-triethyl triamino 1,3,5-triazine, 2,4,6-triphenyl triamino 1,3,5-triazine as well as the other amino triazines disclosed in Widmer U.S. Pat. No. 2,197,357, for example. The aminoplast is normally present as a solvent dispersion of a solvent dispersible, fusible, thermosetting, aminoplast resin forming reaction product of the urea or aminotriazine and the aldehyde. The aminoplast is normally soluble in water and/or alcohol. It can be a low molecular weight resin or a monomer such as dimethylolurea, sesquimethylol urea, trimethylol melamine, dimethylol melamine, hexamethylol melamine, trimethylol melamine trimethyl ether, hexamethylol melamine hexamethyl ether or trimethylol benzoguanamine for example. The use of melamine or other aminotriazines is preferred to urea.

As the organosiloxane-oxyalkylene copolymers useful in the compositions of this invention are of the class that are known as "block" copolymers, block copolymers are composed of at least two sections or blocks at least one section or block composed of one type of recurring units or groups (e.g., siloxane groups as in the copolymers useful in this invention) and at least one other section or block composed of a different type of recurring units or groups (e.g., oxyalkylene groups as in the copolymers useful in this invention). Block copolymers can have linear, cyclic, branched or crosslinked structures.

The siloxane blocks in the copolymers employed in the compositions of this invention contain at least two siloxane groups that are represented by the formula

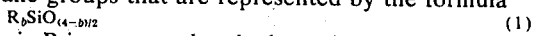
 (1)

wherein R is a monovalent hydrocarbon groups, a halogen-substituted monovalent hydrocarbon group or a divalent hydrocarbon group and $b$ has a value from 1 to 3. Preferably, each R contains from one to about 20 carbon atoms. The groups represented by R can be the same or different in any given siloxane group or throughout the siloxane block, and the value of $b$ in the various siloxane groups in the siloxane block can be the same or different. The divalent hydrocarbon groups represented by R link the siloxane block to the oxyalkylene block. Each siloxane block contains at least one group represented by Formula 1 wherein at least one group represented by R is a divalent hydrocarbon group. The siloxane block has a ratio of hydrocarbon groups to silicon atoms from 1:1 to 3:1.

Illustrative of the monovalent hydrocarbon groups that are represented by the R in Formula (1) are the alkenyl groups (for example, the vinyl group and the allyl group); the cycloalkenyl groups (for example, the cyclohexenyl group); the alkyl groups (for example, the methyl, ethyl, isopropyl, octyl, dodecyl, octadecyl and eicosyl groups); the aryl groups (for example, the phenyl, napthyl, and terphenyl groups); the aralkyl groups (for example, the benzyl and the phenylethyl groups); the alkaryl groups such as, the styryl, tolyl and n-hexylphenyl groups, and the cycloalkyl groups (for example, the cyclohexyl group).

Illustrative of the halogen-substituted monovalent hydrocarbon groups that are represented by R in Formula (1) are the chloromethyl, trichloroethyl, perfluorovinyl, parabromobenzyl, iodophenyl, alpha-chloro-beta-phenylethyl, parachlorotolyl, and bromocyclohexyl groups and the like.

Illustrative of the divalent hydrocarbon groups represented by R in Formula 1 are the alkylene groups (such as, the methylene, ethylene, propylene, butylene, 2,2-di-methyl-1,3-propylene, decylene and eicosylene groups), the arylene groups (such as the phenylene and p,p'-diphenylene groups), and the alkarylene groups (such as, the phenyl-ethylene group). Preferably, the divalent hydrocarbon group is an alkylene group containing from two to four successive carbon atoms. Siloxane groups containing divalent groups as substituents are illustrated by groups having the formulas:

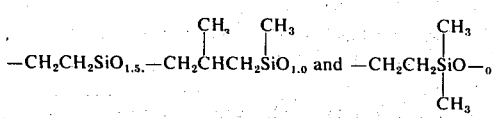

These divalent hydrocarbon groups are linked to a silicon atom of the siloxane block by a silicon-to-carbon bond and to an oxygen atom of the oxyalkylene block by a carbon-to-oxygen bond.

The siloxane block can contain siloxane groups that are represented by Formula (1) wherein either the same hydrocarbon groups are attached to the silicon atoms (e.g., the dimethylsiloxy, diphenylsiloxy and diethylsiloxy groups) or different hydrocarbon groups are attached to the silicon atoms (e.g., the methylphenylsiloxy, phenylethylmethylsiloxy and ethylvinylsiloxy groups).

The siloxane block in the copolymers useful in the compositions of this invention can contain one or more types of siloxanes groups that are represented by Formula 1 provided that at least one group has at least one divalent hydrocarbon substituent. By way of illustration, only ethylenemethylsiloxy groups,

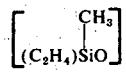

can be present in the siloxane block or the siloxane block can contain more than one type of siloxane group, e.g., the block can contain both ethylenemethylsiloxy groups and diphenylsiloxy groups, or the block can contain ethylenemethylsiloxy groups, diphenylsiloxy groups and diethylsiloxy groups.

The siloxane block contained in the copolymers useful in the compositions of this invention can contain trifunctional siloxane groups (e.g., monomethylsiloxane groups, $CH_3SiO_{1.5}$), difunctional siloxane groups (e.g., dimethylsiloxane groups, $(CH_3)_2SiO_1$), monofunctional siloxane groups (e.g., trimethylsiloxane groups, $(CH_3)_3SiO_{0.5}$)

or combinations of these types of siloxane groups having the same or different substituents. Due to the functionality of the siloxane groups, the siloxane block can be predominantly linear or cyclic or branched or it can have combinations of these structures.

The siloxane block contained in the copolymers useful in the compositions of this invention can contain organic end-blocking or chain terminating organic groups as well as the monofunctional siloxane chain terminating groups encompassed by Formula (1). By way of illustration, the siloxane block can contain such organic end-blocking groups as the hydroxyl group, the aryloxy groups (such as, the phenoxy group), the alkoxy groups (such as, the methoxy, ethoxy, propoxy and butoxy groups), the acyloxy groups (such as the acetoxy group), and the like.

The siloxane blocks in the copolymers useful in the compositions of this invention contain at least two siloxane groups that are represented by Formula (1). Preferably, the siloxane blocks contain a total of at least five siloxane groups that are represented by Formula 1 and by Formula 1-a below. That part of the average molecular weight of the copolymer that is attributable to the siloxane blocks can be as high as 50,000 or greater.

A siloxane block can contain, in addition to the groups represented by Formula (1), one or more siloxane groups represented by the formula:

(1-a)   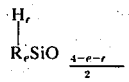

wherein R has the meaning defined in Formula 1, $e$ has a value from 0 to 2, $f$ has a value from 1 to 2 and $e+f$ has a value from 1 to 3.

The oxyalkylene blocks in the copolymers employed in the compositions of this invention each contain at least four oxyalkylene groups that are represented by the formula:

$$[-R'O-] \qquad (2)$$

wherein R' is an alkylene group. Preferably, the alkylene group represented by R' in Formula 2 contains from two to about 10 carbon atoms, and most preferably from two to three carbon atoms. Water-solubility of the copolymer is enhanced when R' contains less than three carbon atoms. It is therefore important that at least one $C_2H_4O$ group be present in the copolymer for it to be at least partially water-soluble. Illustrative of the oxyalkylene groups that are represented by Formula 2 are the oxyethylene, oxy-1,2-propylene, oxy-1,3-propylene, oxy-2,2 - dimethyl - 1,3 -propylene, oxy-1,10-decylene groups, and the like.

The oxyalkylene blocks in the copolymers useful in the compositions of this invention can contain one or more of the various types of oxyalkylene groups represented by Formula 2. By way of illustration, the oxyalkylene blocks can contain only oxyethylene groups or only oxypropylene groups or both oxyethylene and oxypropylene groups, or other combinations of the various types of oxyalkylene groups represented by Formula 2.

The oxyalkylene blocks in the copolymers useful in the compositions of this invention can contain organic end-blocking or chain terminating groups. By way of illustration, the oxyalkylene blocks can contain such end-blocking groups as the hydroxy group, the aryloxy group (such as, the phenoxy group), the alkoxy groups (such as, the methoxy, ethoxy, propoxy and butoxy groups), alkenyloxy groups (such as, the vinyloxy and the allyloxy groups). Also, single group can serve as an end-blocking group for more than one oxyalkylene block. For example, the glyceroxy group,

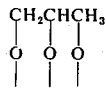

can serve as an end-blocking group for three oxyalkylene chains.

The oxyalkylene blocks in the ccopolymers useful in the compositions of this invention each contain at least four oxyalkylene groups that are represented by Formula 2. Preferably, each block contains at least five of such groups. That part of the average molecular weight of the copolymer that is attributable to the oxyalkylene blocks can vary from 176 for $(C_2H_4O)_4$ to 50,000 or greater.

The block copolymers useful in the compositions of this invention can contain siloxane blocks and oxyalkylene blocks in any relative amount. In order to possess desirable properties, the copolymer should contain from 5 parts by weight to 95 parts by weight of siloxane blocks and from 5 parts by weight to 95 parts by weight of oxyalkylene blocks per 100 parts by weight of the copolymer. Preferably, the copolymers contain 5 parts by weight to 50 parts by weight of the siloxane blocks and from 50 parts by weight to 95 parts by weight of the oxyalkylene blocks per 100 parts by weight of the copolymer.

The block copolymers useful in the compositions of this invention can contain more than one of each of the blocks and the blocks can be arranged in various configurations such as, linear, cyclic or branched configurations.

Organosiloxane-oxyalkylene block copolymers which are especially useful in compositions of the present invention include those having the following formulas:

(p) Me$_3$Si(OSiMe$_2$)$_6$[OMeSiCH$_2$CH$_2$CH$_2$O(C$_2$H$_4$O)$_8$Me]$_7$OSiMe$_3$

Molecular weight of about 3600

(q) Me$_3$Si(OSiMe$_2$)$_{19}$[OMeSiCH$_2$CH$_2$CH$_2$O(C$_2$H$_4$O)$_{19}$(C$_3$H$_6$O)$_{14}$Bu]OSiMe$_3$

Molecular weight of about 7000

(r) Me$_3$Si(OSiMe$_2$)$_7$[OMeSiCH$_2$CH$_2$CH$_2$O(C$_2$H$_4$O)$_{15}$Me]$_3$OSiMe$_3$

Molecular weight of about 3100

Specific commercial organosilicone block copolymers within the Morehouse patent disclosure which can be used include L-520 which has the structure CH$_2$ = CHSi(O(Si(CH$_3$)$_2$ O)$_z$ (CH$_2$CH$_2$O)$_x$ (C$_3$H$_6$O)$_y$ —C$_4$H$_9$)$_3$ where the organic portion is a mixed copolymer containing equal weights of propylene and ethylene oxides and terminated with a butoxy group. The silicon base and each of thee three organic branch chains has a molecular weight of about 1500 so that the total molecular weight is about 6000 (see Kirk-Othmer, Encylopedia of Chemical Technology, 2nd Edition, Vol. 19, page 554), L-530 which is similar to L-520 is a liquid having a viscosity of 2000 centistokes at 25°C. L-77 which also can be used is a similar organo silicone block copolymer in liquid form having a viscosity of 18 centistokes at 25°C and a specific gravity of 1.02. L-77 is also described in U.S. Pat. No. 3,299,112 and U.S. Pat. No. 2,846,458. L-530 is described in U.S. Pat. No. 2,846,458. L-520 is described in U.S. Pat. No. 2,834,748. The entire disclosure of these three patents is hereby incorporated by reference.

As stated, there can be used 0.05–5%, preferably 1–5% of the organosiloxane-oxyalkylene block copolymer based on the hydrophilic acrylic polymer.

In polymerizing the hydrophilic acrylate monomer there can be employed any conventional cross-linking agent which does not interfere with the transparency of the coating in an amount of 0.025 to 20%, preferably 0.1–1%.

In addition to the crosslinking agents previously mentioned there can be added for example ethylene glycol dimethacrylate, ethylene glycol diacrylate, divinyl benzene, divinyl toluene, triallyl melamine, N,N'-methylene-bis-acrylamide, glycerine trimethacrylate, diallyl maleate, divinyl ether, diallyl mono ethylene glycol citrate, allyl vinyl maleate, ethylene glycol vinyl allyl citrate, diallyl itaconate, ethylene glycol diester of itaconic acid, propylene glycol dimethacrylate, propylene glycol diacrylate, divinyl sulfone, hexahydro-1,3,5-triacryltriazine, triallyl phosphite, diallyl ester of benzene phosphonic acid, polyester of maleic anhydride with triethylene glycol, diethylene glycol diacrylate, polyallyl sucrose, polyallyl glucose, e.g., diallyl sucrose and triallyl glucose, sucrose diacrylate, glucose dimethacrylate, pentaerythritol diacrylate, sorbitol dimethacrylate.

Polymerization can take place at room temperature or below, e.g. at 20° to 150°C.

Free radical catalysts such as t-butyl peroctoate, isopropyl percarbonate, benzoyl peroxide, methyl ethyl ketone peroxide, cumene hydroperoxide, dicumyl peroxide can be employed to hasten polymerization and/or cure. The catalysts are usually employed in an amount of 0.05 to 1.0 gram, preferably 0.1 to 0.2 gram of catalyst per 100 grams of polymerizable material. The reaction is also catalyzed by ultraviolet light, gamma and other irradiation. The nonfog coating can be applied to the transparent or reflecting substrate to prevent coating in a thickness of 0.01 to 10 mils or more. Preferably the coating is applied at a thickness of not over 1 mil.

The transparent reflecting surfaces which can be treated include glass surfaces such as automobile windows, e.g., the windshield, backlight and side windows, train windows, windows in buildings, e.g., apartments, homes, stores and office buildings, glass mirrors, eyeglasses including for example conventional eyeglasses, sunglasses, diving masks and ski glasses, camera lenses, microscope lenses, telescope lenses, binoculars and opera glasses, gun sights, drinking glasses (whereby the condensation occurring when iced drinks are placed therein is eliminated), transparent plastic surfaces including aeroplane windows, car and train windows, transparent films and containers used as coverings for packaged foods, e.g., meat packaged in a tray having a transparent top film of biaxially oriented irradiated polyethylene, reflecting metal surfaces such as chrome mirrors, etc.

As used in the present specification and claims the term "automobile" is intended to cover cars, trucks, buses and all other automotive vehicles.

The transparent plastic having a fogging tendency can be polymerized methyl methacrylate, polycarbonate, e.g., 4,4'-isopropylidene diphenol polycarbonate as well as other polycarbonates as shown in Fritz U.S. Pat. No. 3,305,520 and Christopher and Fox "Polycarbonates" (pp. 161–176 (1926)), diethylene glycol bis (allyl carbonate), cellulose acetate, cellulose propionate, cellulose acetate-propionate, biaxially oriented polyethylene, biaxially oriented irradiated polyethylene (e.g., irradiated to 2–20 megarad), biaxially oriented polypropylene, biaxially oriented polystyrene, biaxially oriented styrene-acrylonitrile copolymer, biaxially oriented polyethylene terephthalate (Mylar), biaxially oriented vinyl chloride, biaxially oriented vinylidene chloride polymers, e.g., vinylidene chloride-vinyl chloride copolymer, vinylidene chloride-acrylonitrile copolymer, quench chilled polyethylene, quench chilled polypropylene and transparent fogging plastics made by other conventional techniques.

As stated reflecting metal surfaces can be made nonfogging as can reflecting plastic, e.g., metallized Mylar or reflecting glass, e.g., a mirror (glass having a metal backing).

Glass windows, for example, can be in the form of tempered glass, plate glass or safety glass, e.g., two layers of glass laminated together with a thin layer of polyvinyl butyral or two layers of glass bonded together with Volan (methacrylato chromic chloride).

The poly-HEMA solution used in Example 1 (and elsewhere below) was prepared by adding 20 parts by weight of polymerization grade hydroxyethyl methacrylate (HEMA) (containing 0.04–0.06 ppm of hydroquinone monomethyl ether as an inhibitor and also containing 0.3% of ethylene glycol dimethacrylic and 0.3% of methacrylic acid as impurities) to 80 parts by weight of commercial grade 2-methoxyethanol (Methyl Cellosolve). There was added 0.05 part by weight of 2,2'-azobisisobutyronitrile as an initiator and polymerization was carried out at 80°C until a Brookfield viscosity of 300–350 centipoises was reached. This is also called Formulation C.

The Lens Coating was made from (a) 18 parts of polymerization grade HEMA (as set forth supra), (b) 0.8 part polymerization grade t-butyl-aminoethyl methacrylate and (c) 1.2 parts of N-isopropylacrylamide. The mixture of monomers was added to 80 parts of Methyl Cellosolve and 0.1 part of t-butyl peroctoate as an initiator and heated at 90°–93°C. until a Brookfield viscosity of 150–200 centipoise was reached. This was adjusted to 16% solids with Methyl Cellosolve. The product is designated Formulation A.

To 93.5 parts of Formulation A there was added (a) 2.7 parts of xylene, (b) 3.0 parts of water, (c) 0.06 part of Raybo 3 (an antisilk agent which is a 1% polymethyl siloxane solution in xylene) and (d) 0.75 part of Uformite MM 83, a methoxymethyl-melamine polymer 80% solids in a mixture of isobutanol and isopropanol. This final product is the Lens Coating.

Glass Coating III was made by taking Formulation C and reducing it from 20% solids to 17.7% solids by adding more Methyl Cellosolve. This mixture is called Formulation B. To 96.0 parts of Formulation B there were added (a) 3.92 parts of xylene, (b) 0.08 parts of Raybo 3, (c) 0.26 part of silane A-187 (gamma-glycidoxypropyl trimethoxy silane), (d) 0.68 part of Cymel 303 (hexamethoxymethyl melamine) and (e) 0.01 part of toluene sulfonic acid.

Glass Coating I was made by adding to 96.0 parts of Formulation B, (a) 3.92 parts of xylene, (b) 0.08 part Raybo 3, (c) 0.84 part of ERL-4221 (3,4-epoxy, cyclohexylmethyl -3', 4'-epoxycyclohexane carboxylate), (d) 0.21 part maleic anhydride and (e) 0.06 part triethylene diamine.

Unless otherwise indicated, all parts and percentages are by weight.

EXAMPLE 1

A poly-HEMA solution in 2-methoxyethanol (20% solids) (Formulation C) was diluted to two percent solids with the same solvent. A 12 × 12 inch polyethylene film was coated by wiping with a soft cloth saturated with the diluted poly-HEMA solution. The coated film was dried for 30 minutes at 150°F. The addition of 0.1% of L-77 to this solution improved the wettability and uniformity of coating and enhanced the anti-fog performance of the coated polyethylene film. This amount of the organosilicone-oxyalkylene copolymer used did not impair the film's appearance or mechanical properties. Table I shows the synergistic anti-fog capacities of the poly-HEMA/L-77 coatings on polyethylene films.

TABLE I

EFFECT OF L-77 ON THE ANTI-FOG PERFORMANCE OF POLY-HEMA

| COATING SOLUTION | APPLIED CONC. SOLIDS, % | THICKNESS OF COATING, MILS. | "BOILING WATER TEST"* | "REFRIGERATION TEST"* |
|---|---|---|---|---|
| Poly-HEMA (in 2-methoxyethanol) | 2.0 | 0.01 | 1.0 | 6.0 |
| L-77 (in ethanol) | 0.1 | — | 0.0 | 1.5 |
| Poly-HEMA/L-77 (in 2-methoxyethanol) | 2.0/0.1 | 0.01 | 6.0 | >15.0 |

*Minutes to fogging

For the "Boiling Water Test," the coated substrate was put on top of a 200 ml. beaker containing 100 ml. of boiling water. While the water was kept boiling, time, in minutes, to fogging of the film was observed. The coating is rated satisfactory if it remains clear for more than 1 minute. For the "Refrigeration Test," the coated substrate was put on top of a 200 ml. beaker containing 100 ml. of room temperature water (25°C). The beaker was then put in a refrigerator (5°C). Time, in minutes, to fogging was observed. The coating passes the test if it remains fog free for more than 5 minutes.

EXAMPLE 2

L-77 (0.15 weight percent) was incorporated in the Lens Coating identified above. A polycarbonate substrate (American Allsafe "monogoggle" lens) was coated by dipping in the Lens Coating. After air drying the coated lenses were heat cured. The anti-fog activity was determined by a standard method. It is based on time to half-fogging when the samples are exposed to water vapor at 40°C under a constant air flow of 1100 cc's per minute. The permanency of the anti-fog activity was determined by intermittent testing. Samples were exposed to the anti-fog test for a 5 minute period or until failure (half-fogging). If failure had not occurred at 5 minutes, the sample was removed from the test and allowed to air dry for 20 minutes after which this test cycle was repeated up to nine additional times. Table II shows again the synergistic anti-fog activity of Lens Coating in the presence of one part per hundred resin (phr) of L-77 in the formulation. The HEMA terpolymer controlled L-77 release, thus imparting permanency of the synergistic anti-fog activity. L-77 was most effective in the Lens Coating and moderately effective in Glass Coating I. The optimum level of L-77 was 1.0 phr.

In both the Lens Coating/L-77 and Glass Coating-I/L-77 systems a degree of sustained anti-fog activity, enhanced by the silicone copolymers, was observed. L-77 (1.0 phr) in the Lens Coating film was effective for three 10 minute anti-fog/dry cycles when tested intermittently with an air-drying period of 20 minutes between tests. L-77 (1.0 phr) in the Glass Coating-I film was effective for two 10 minute anti-fog/dry cycles under the same conditions. Under normal wear conditions, where severe water condensation is limited, we can expect a relatively high degree of serviceability of the HYDRON/L-77 anti-fog coatings.

EXAMPLE 4

Formulation C was diluted to 2% solids in 2-methoxyethanol. A 6 × 6 inch irradiated basically oriented polyethylene film 1 mil thick (8 megarad irradiation) was coated by wiping with a soft cloth saturated with the diluted poly-HEMA solution. The coated film was dried for 30 minutes at 150°F. while being held in tension to prevent shrinkage. The addition of 0.2% of $Me_3Si(OSiMe_2)_{19}$ [OMeSi $CH_2$ $CH_2$ $CH_2$ — $O(C_2H_4O)_{19}(C_3H_6O)_{14}Bu$]$OSiMe_3$, molecular weight about 7000 enhanced the anti-fog performance of the coated irradiated polyethylene film.

TABLE II

| Coating Solution | ANTI-FOG PERFORMANCE OF HYDRON LENS COATING/L-77 Anti-Fog Capacity minutes (Intermittent testing) | | | | | |
|---|---|---|---|---|---|---|
| Lens Coating | 0.70/0.60/0.60 | | | | | |
| Lens Coating Containing L-77 at 0.15 wt. pts. | 5.00 (No Fog) | 5.00 (No Fog) | 5.00 (No Fog) | 5.00 (No Fog) | 5.00 (No Fog) | 5.00 (No Fog) |
| Ethanol containing L-77 at 0.15 wt. pts.* | 5.00 (No Fog) / 5.00 (No Fog) | 5.00 (1/3 Fog) / 5.00 (1/10 Fog) | 5.00 (1/3 Fog) / 0.05 | 5.00 (1/3 Fog) | | |

*Film cast from this solution exhibited haze and required buffing to clarity before anti-fog testing.

The organo-siloxane-oxyalkylene block copolymers can also be incorporated into a hydroxyethyl methacrylate polymer anti-fog film. This is based on saturating cured films with a cleaning solution containing L-77 or L-530. As it cleans, the hydroxyethyl methacrylate polymer film either absorbs or adsorbs the silicone copolymer. The charged hydroxyethyl methacrylate polymer film exhibits enhanced anti-fog capacity. The preparation and application of HYDRON cleaning solution are described in Example 3.

EXAMPLE 3

An experimental Cleaning Solution was prepared by incorporating 1 weight percent of L-77 into a water-/isopropanol (9/1 by volume) solution which had been adjusted to pH 9.5 with ammonium hydroxide. This solution was applied generously via spraying and buffed to dryness on both uncoated substrates (window glass, polycarbonate) and the same substrates with a hydroxyethyl methacrylate polymer coating.

Table III shows that the L-77 applied to the hydroxyethyl methacrylate surfaces results in greatly enhanced anti-fog activity.

TABLE III

EFFECTS OF L-77 APPLIED TO HYDROXYETHYL METHACRYLATE POLYMER COATINGS via CLEANING SOLUTION

| TEST SAMPLE | ANTI-FOG CAPACITY (HL ANALYTICAL METHOD T:10), MINUTES: | |
|---|---|---|
| | BEFORE USE OF CLEANING SOLUTION | AFTER USE OF CLEANING SOLUTION |
| Polycarbonate lens | 0.00 | 18.00 |
| Polycarbonate lens with Lens Coating | 0.70 | 38.00 |
| Window Glass | 0.00 | 15.00 |
| Window Glass with Glass Coating III | 0.75 | 24.00 |

In each of Examples 1, 2 and 3 in place of L-77 there can be used the same amount of the organosiloxane-oxyalkylene block copolymer (q) of the Morehouse patent having a molecular weight of about 7000 with similar results. Likewise there can be used in Examples 1, 2 and 3 the same amount of L-520 in place of L-77. The coating can consist of or consist essentially of the hydrophilic acrylate or methacrylate and the organosiloxane-oxyalkylene block copolymer.

What is claimed is:

1. A normally fogging transparent or reflecting substrate having on at least one surface thereof a non-fogging water insoluble hydrophilic coating comprising: (1) a hydrophilic acrylate or methacrylate polymer selected from the group consisting of polymers of hydroxy lower alkyl acrylates, hydroxy lower alkyl methacrylates, hydroxy lower alkoxy lower alkyl acrylates and hydroxy lower alkoxy lower alkyl methacrylates and (2) in an amount sufficient to synergistically improve the anti-fog activity of the hydrophilic polymeric compound of an organo-siloxane-oxyalkylene block copolymer comprising (a) at least one siloxane block containing at least two siloxane units represented by the formula:

$R_bSiO_{(4-b)/2}$ whrein R contains from one to about 20 carbon atoms and is selected from the group consisting of monovalent hydrocarbon groups, halogen-substituted monovalent hydrocarbon groups, and divalent hydrocarbon groups and b has a value from 1 to 3 inclusive, said siloxane block containing at least one of said siloxane units wherein at least one R group is a divalent hydrocarbon group, and (b) at least one oxyalkylene block containing at least four oxyalkylene groups represented by the formula—R'O—, wherein R' is an alkylene group containing from two to about 10 carbon atoms, said siloxane oxyalkylene blocks being interconnected by said divalent hydrocarbon group.

2. A substrate according to claim 1 wherein the hydrophilic polymer is a polymer of hydroxyethyl methacrylate.

3. A substrate according to claim 1 wherein the organosiloxane-oxyalkylene block copolymer is 0.05–5% of the hydrophilic polymer.

4. A substrate according to claim 3 wherein the substrate is glass.

5. A substrate according to claim 3 which is a polycarbonate.

6. A substrate according to claim 3 which is polyethylene or polypropylene.

7. A substrate according to claim 6 which is irradiated polyethylene.

8. A substrate according to claim 3 wherein the substrate is an organic plastic.

9. A substrate according to claim 8 wherein the organic substrate is selected from the group consisting of polymerized methyl methacrylate, polycarbonate, cellulose acetate, cellulose propionate, cellulose acetate-propionate, biaxially oriented polyethylene, biaxially oriented irradiated polyethylene, biaxially oriented polypropylene, biaxially oriented polystyrene, biaxially oriented styrene-acrylonitrile copolymer, biaxially oriented polyethylene terephthalates, biaxially oriented vinyl chloride polymer, biaxially oriented vinylidene chloride polymer, quench chilled polyethylene and quench chilled polypropylene.

10. A substrate according to claim 1 which is a lens.

11. A substrate according to claim 1 which is a window.

12. A substrate according to claim 1 which is a mirror.

13. A substrate according to claim 1 which is a drinking glass.

14. A substrate according to claim 1 wherein the coating consists essentially of said hydrophilic polymer and said organosiloxane-oxyalkylene block copolymer.

* * * * *